United States Patent [19]

Kiniczky et al.

[11] Patent Number: 4,994,296
[45] Date of Patent: Feb. 19, 1991

[54] DEHYDRATED DAIRY PRODUCT AND PROCESS FOR MAKING

[75] Inventors: Márta Kiniczky, Budapest; Gyöngyvér Vásárhelyi, Szeutendre, both of Hungary

[73] Assignee: Gyógynövény Kutató Intézet K.V., Budakalasz, Hungary

[21] Appl. No.: 353,679

[22] PCT Filed: Sept. 2, 1988

[86] PCT No.: HU88/58

§ 371 Date: Jun. 2, 1989

§ 102(e) Date: Jun. 2, 1989

[87] PCT Pub. No.: WO89/01739

PCT Pub. Date: Sept. 2, 1988

[30] Foreign Application Priority Data

Sep. 2, 1988 [AT] Austria ............................. 92240/87
Sep. 2, 1988 [WO] PCT Int'l Appl....PCT/HU88/00058

[51] Int. Cl.$^5$ ..................... A23B 4/027; A23C 3/08
[52] U.S. Cl. ................................. 426/580; 426/471; 426/581; 426/582; 426/583
[58] Field of Search ............... 426/580, 582, 583, 581, 426/471

[56] References Cited

U.S. PATENT DOCUMENTS

| | | |
|---|---|---|
| 2,995,447 | 8/1961 | Cipolla et al. ..................... 426/583 |
| 3,840,996 | 10/1974 | Grindstaff et al. .................. 426/583 |
| 4,652,453 | 3/1981 | Pomper et al. ..................... 426/656 |

OTHER PUBLICATIONS

Perry et al., Chemical Engineer's Handbook, 5th Ed., McGraw Hill Book Co, N.Y., 1973, Chapter 21, p. 41.
Hall et al., Drying Milk and Milk Products, Avi Publishing Co., Inc., 1966, Westport Conn. p. 177.

*Primary Examiner*—Donald E. Czaja
*Assistant Examiner*—Helen Pratt
*Attorney, Agent, or Firm*—Schweitzer Cornman & Gross

[57] ABSTRACT

The invention relates to dehydrated dairy products as well as to a process for preparing these products. The dairy products according to the invention comprise as basic matrial preferably cheese, butter or curd in a combination with highly disperse colloidal silicon dioxide and their water content amounts to 0.3 to 15% by mass. According to the process of the invention, the basic material is mixed with 0.5 to 25% by mass of a highly disperse colloidal silicon dioxide, the mixture is granulated and then dried at a maximum temperature of 30° C. down to a water content of 0.3 to 15% by mass. These products preserved according to the invention maintain their taste, aroma and odor characteristic of the fresh starting substances.

13 Claims, No Drawings

DEHYDRATED DAIRY PRODUCT AND PROCESS FOR MAKING

FIELD OF THE INVENTION

This invention relates to dehydrated dairy products and to a process for their preparation.

BACKGROUND OF THE INVENTION

Dairy products, such as cheese, butter and curd are among the most frequently consumed foodstuffs. They are most nourishing due to their high protein and the presence of substances and vitamins essential for good nourishment. However, these dairy products when prepared by conventional methods can be stored only for a relatively short time and their storage and transportation are relatively expensive due to their high water content. Thus it is highly desirable to produce dairy products with a diminished water content, particularly for large-scale uses as mass feeding, and public catering.

A basic requirement is that these preserved products should resemble the traditionally prepared dairy products with respect to taste, composition, nutritive value and organoleptic characteristics.

Known processes for preserving cheese, are aimed at concentrating the protein and fat content and at decreasing the water content of cheese. Traditional drying processes are described e.g. in U.S. Pat. Nos. 3,482,999; 2,401,320; and 1,752,821, however, the methods described in those patents require the use of a high drying temperature causing the removal and alteration of the desired volatile, content, odor, taste and aromatizing substances thus, they do not ensure that the finished product maintains the organoleptic properties which are characteristic of the starting fresh cheese.

According to a process described in U.S. Pat. No. 3,694,231 an easy-flowing, granular, dehydrated cheese product can be prepared by chopping the cheese pieces and freeze drying them by freezing in a liquified gas (e.g. nitrogen) and then drying the resulting cheese granules at 20° C. in a frozen state in a fluidized bed. This is expensive and, therefore, uneconomical.

In U.S. Pat. Nos. 3,573,931 and 3,573,930 the cheese with a high water content is extruded in an extruding press and then dried at a high temperature to a lowered water content of 17%.

United Kingdom patent specification No. 2,073,574 describes the preparation of preserved cheese products by adding powdered α-cellulose to the cheese to be processed, then chopping and drying it to a maximum water content of 18% by mass, preferably of 7 to 10% by mass. According to the examples of that patent, drying is carried out at a temperature of 100° to 400° F. (38° to 204° C.), while preventing the cheese from melting while drying. This process avoids melting, but the aromatizing substances of the cheeses are damaged by the high temperature drying and the additive binds only the water content and is otherwise unsuitable for binding the fat content. No data are given concerning the shelf life of the cheese obtained.

DESCRIPTION OF THE INVENTION

Our investigations were aimed at developing a process for preserving dairy products on an industrial scale, useful for preserving the most important dairy products, such as cheese, butter and curd, without the loss of desirable organoleptic, biochemical and physicochemical characteristics.

Surprisingly, it has been found that preserved dairy products satisfying the above requirements can be prepared by mixing the dairy product with a preservingly effective amount of an alimentarily acceptable, highly disperse colloidal silica and then drying the mixture thus obtained. The actual preservingly effective concentrations of the edible silica can be determined by routine experimentation.

The invention is based on the recognition that the water content and, by choosing the appropriate type of silica also the fat content of dairy products can very simply and efficiently be bound by mixing those with a highly dispersed colloidal silica. Such silica possesses an extraordinarily good water binding capacity when maintained in its powder form, it is capable to bind about 40% by mass of water. Other preferable properties of such silicas are their large specific surface area, low apparent density, a dispersion degree of from about 0.007 to about 0.04 $\mu$m, an extraordinary chemical purity, and inert character. Furthermore, they are colorless, odorless, and have an amorphous structure. One suitable colloidal silica is sold under the trademark Aerosil 200.

Aerosil 200 has some of the following desirable properties:

- Specific surface area: 200 $m^2/g$
- Apparent density: 60 g/liter
- Average particle size: 0.012 $\mu$m
- Silicon dioxide content: 99.8%.

A hydrophobic type of silica sold under the trademark Aerosil R-972, can be suitably employed in a preparation of 0.1 to 20% by mass, together with the hydrophilic colloidal silica for preserving cheese types with a high fat content. The fat is completely and reversibly bound by the hydrophobic type silica.

Thus, the present invention relates to a dairy product with a water content of from about 0.3 to about 15% by mass, which comprises the mixture of a comminuted starting dairy product, such as butter, cheese, and curd, with from about 0.5 to about 25% by mass of a highly disperse colloidal silica.

The invention further relates to a process for the preparation of dehydrated dairy products, with good shelf life, which comprises mixing a comminuted starting dairy product with from about 0.5 to about 25% by mass of a highly disperse colloidal silica, granulating mixture and drying it at a temperature of about 30° C. until the water content of the mixture in from about 3 to about 15% by mass.

We found that dairy products such as cheese, butter and curd products preserved by the process of the present invention can be stored for over 3 years while while maintaining their taste, odor and aroma substances which are characteristic of the fresh products.

The process according to the invention is equally useful for the preservation of very hard, hard, semi-hard, soft, and processed cheeses as well as butters and curds. The cheeses of various kinds can be preserved also in the form of combinations of various cheese compositions. The cheese compositions can optionally also be formed also by combining the solid preserved products.

The water content of from about 30 to about 50% by mass of the fresh cheese products can be reduced by drying at room temperature to an optional value between from about 3 and about 15% by mass. The biochemical and microbiological stability of the products containing 3 to 6% by weight of water can be ensured for several years. It should be noted that the cheese products prepared by using the process according to the invention are not hygroscopic, i.e. they do not absorb any moisture from the environment which is an additional preferable property.

A further advantage of the process according to the invention resides in that the total fat content of the products can be maintained.

The invention is illustrated in greater detail by the following examples.

EXAMPLE 1

200 g of a very hard parmesan cheese is ground in an electric grinder, then mixed with 10 g of a hydrophylic colloidal silica. After homogenizing in a kneader the mixture is granulated and then dried at room temperature to a water content of 5.8%. The resulting preserved product has a color, taste, and aroma characteristic of the fresh cheese even after a storage for 3 years at room temperature.

EXAMPLE 2

200 g of a hard cheese, such as Hungarian Pannonia or cheddar cheese, is ground in an electric grinder, then 10 g of hydrophilic colloidal silica is added. After homogenizing in a kneader and granulating, the mixture is dried at room temperature to a water content of 4.7%. The product thus obtained maintains the taste and aroma characteristics of the fresh cheese even after 3 years of storage.

EXAMPLE 3

200 g of a hard cheese according to Example 2 is comminuted in a disintegrator and homogenized with 8 g of hydrophilic and 2 g of hydrophobic colloidal silica, the granulated and dried at room temperature to a water content of 5.5%. The preserved cheese product thus prepared possesses a characteristically pleasant taste and aroma even after storage of 3 years at room temperature.

EXAMPLE 4

200 g of a semi-hard cheese (Roquefort or Tilsit type cheese) is comminuted in a disintegrator mill, then 10 g of a hydrophilic colloidal silica is added. After homogenizing in a kneader and then granulating, the product is dried at room temperature to a water content of 3.6%. The preserved cheese product thus prepared possesses the color and aroma characteristics of the fresh cheese even after storage for 3 years at room temperature.

EXAMPLE 5

200 g of the semi-hard cheese of Example 4 is comminuted in a disintegrator mill, then 8 g of hydrophilic and 2 g of hydrophobic colloidal silica is added to the crumbled cheese. After homogenizing in a kneader and granulating, the mix is dried at room temperature to a water content of 4.5%. The preserved cheese product thus prepared has the characteristic pleasant taste and aroma of the starting cheese even after storage for 3 years at room temperature.

EXAMPLE 6

200 g of a soft cheese (Hungarian Aniko or Hungarian Göcseji cheese, ewecheese, or ewe-curd) is ground in an electric grinder, and 10 g of hydrophilic colloidal silica is added to the comminuted cheese. After homogenizing, then granulating, the granulate is dried at room temperature to a water content of 6.3%. The preserved product thus prepared maintains the aroma substances characteristic of the fresh starting cheese even after storage for 3 years at room temperature.

EXAMPLE 7

200 g of the soft cheese of Example 6 is shredded and 8 g of hydrophilic and 2 g of hydrophobic colloidal silica is added. After homogenizing and granulating, the granulate is dried at room temperature to a water content of 6.3%. The preserved product thus prepared maintains the taste and aroma substances characteristic of the fresh starting cheese even after storage for 3 years at room temperature.

EXAMPLE 8

After adding 20 g of hydrophilic colloidal silica to 200 g of smearable processed cheese, the mixture is homogenized in a mixer, then dried at room temperature to a water content of 4.7%. The preserved product thus prepared maintains the taste and aroma substances characteristic of the fresh starting cheese even after storage for 3 years at room temperature.

EXAMPLE 9

After grinding 10 g of parmesan, 100 g of Hungarian Pannonia, and 100 g of blue cheese in an electric grinder, the cheese mixture is homogenized and 15 g of hydrophilic colloidal silica is added. After homogenizing in a kneader, the mix is dried at room temperature to a water content of 4.5%. The preserved cheese mixture product thus prepared maintains the pleasant composition of the aromas of the starting components even after a storage for 3 years at room temperature.

EXAMPLE 10

20 kg of hard cheese (Hungarian Pannonia or Swiss) is ground in an industrial electric grinder and then homogenized with 1400 g of hydrophilic colloidal silica in a kneader. after granulating in an oscillating granulator, the mixture is dried at a maximum temperature of 26° C. in a fluidizing drying apparatus to a water content of 6.5%. The preserved cheese granulate thus prepared maintains the taste, aroma, odor and color substances characteristic of the starting fresh cheese.

EXAMPLE 11

After homogenizing 13 kg of blue cheese with 780 g of hydrophilic colloidal silica in a kneader, the mixture is granulated in an oscillating granulator and then dried in a fluidizing dying apparatus at 28° C. to a water content of 4.9%. The taste, odor, color and aroma substances of the preserved cheese granulate thus prepared remain without any alteration.

EXAMPLE 12

20 kg of ewe-cheese is ground in an electric grinder and then homogenized with 1000 g of hydrophilic colloidal silica in a kneader. After granulating in an oscillating granulator, the mixture is dried at 21° C. in a fluidizing dying apparatus for 30 minutes to a water content of 4.5%. The taste, color and aroma substances of the preserved cheese granulate thus prepared remain unaltered during manufacturing and storage.

EXAMPLE 13

40 g of hydrophilic colloidal silica is mixed with 200 g of creamery butter. The mix is then homogenized and granulated. The granulate is dried at room temperature to a water content of 1.6%. The butter granulate maintains the characteristic taste, odor, color and aroma of fresh butter during the manufacturing and storage.

EXAMPLE 14

35 g of hydrophilic colloidal silica is mixed with 200 g of butter (Margaréta type), then homogenized and granulated. The granules are dried at room temperature to a water content of 0.4%. The resulting butter granules maintain the properties characteristic of the starting material during manufacturing and storage.

EXAMPLE 15

30 g of hydrophilic colloidal silica is added to 200 g of curd (cottage cheese or farmer's cheese), then homogenized and granulated. The granules are dried at room temperature to a water content of 5.3%. The curd granulate thus obtained maintains the taste, odor, color and aroma substances characteristic of the fresh starting curd during manufacturing and storage.

We claim:

1. A preserved alimentary preparation, which comprises a substantially dehydrated mixture of a dairy product with a preservingly effective amount of an alimentarily acceptable, colloidal silica.

2. The preserved alimentary preparation of claim 1, wherein the dairy product is cheese, butter, or curd.

3. The preserved alimentary preparation of claim 1, wherein the preservingly effective amount is from about 0.5 to about 25% by mass based on the dairy product.

4. The preserved alimentary preparation of claim 1, wherein said substantially dehydrated preparation contains from about 0.3 to about 15% by mass of water.

5. The preserved alimentary preparation of claim 4, wherein the concentration of water is from about 3 to about 6% by mass.

6. The preserved alimentary preparation of claim 1, wherein said silica has a dispersion degree of from about 0.007 to about 0.04 $\mu$m.

7. The preserved alimentary preparation of claim 1, wherein said alimetarily acceptable, silica comprises a mixture of a hydrophilic and of a hydrophobic colloidal silica.

8. The preserved alimentary preparation of claim 7, wherein the dairy product has a relatively large fat content, and wherein the concentration of the hydrophobic silica is from about 0.1 to about 20% by mass.

9. A process for preparing the preserved alimentary preparation which comprises mixing a dairy product with a preservingly effective amount of an alimentarily acceptable, colloidal silica, and substantially dehydrating the mixture.

10. The process of claim 9, wherein said dairy product is mixed with from about 0.5 to about 25% by mass of said silica, granulating the mixture, and drying the granulated mixture at a maximum temperature of 30° C. to a water content of from about 0.3 to about 15% by mass.

11. The process of claim 10, wherein said drying is conducted until a water content of from 3 to about 6% by mass is reached.

12. The process of claim 9, wherein said silica comprises a preservingly effective amount of a mixture of an alimentarily acceptable, hydrophobic colloidal silica, and a like colloidal hydrophilic silica.

13. The process of claim 12, wherein said hydrophobic silica comprises from about 0.1 to about 20% by mass based on the total amount of silica.

* * * * *

UNITED STATES PATENT AND TRADEMARK OFFICE
CERTIFICATE OF CORRECTION

PATENT NO. : 4,994,296
DATED : February 19, 1991
INVENTOR(S) : Marta Kiniczky, et al.

It is certified that error appears in the above-identified patent and that said Letters Patent is hereby corrected as shown below:

Foreign Application Priority Data:

Austria ....... 92240/87   should be corrected to

Austria ....... 2240/87--.

Signed and Sealed this

Third Day of September, 1991

Attest:

HARRY F. MANBECK, JR.

*Attesting Officer*           *Commissioner of Patents and Trademarks*